United States Patent
Kou et al.

Patent Number: 6,046,838
Date of Patent: Apr. 4, 2000

[54] AUTOMATIC BIAS CONTROL FOR ELECTRO-OPTIC MODULATORS

[75] Inventors: Abraham H. Kou, San Jose; Ting K. Yee, Foster City; Norman L. Swenson, Fremont, all of Calif.

[73] Assignee: Kestrel Solutions, Inc., Mountain View, Calif.

[21] Appl. No.: 09/218,731

[22] Filed: Dec. 22, 1998

[51] Int. Cl.[7] .............................. G02F 1/03; H04B 10/04
[52] U.S. Cl. ...................... 359/245; 359/239; 359/181; 359/187; 359/276; 385/2; 385/3; 372/12; 372/26
[58] Field of Search ................... 359/245, 250, 359/249, 237, 238, 239, 181, 187, 180, 276, 279; 385/2, 3, 22, 41; 372/12, 26

[56] References Cited

U.S. PATENT DOCUMENTS

| | | | |
|---|---|---|---|
| 3,988,704 | 10/1976 | Rice et al. | 359/250 |
| 5,003,624 | 3/1991 | Terbrack | 359/181 |
| 5,015,053 | 5/1991 | Johnson | 385/2 |
| 5,400,417 | 3/1995 | Allie et al. | 385/2 |
| 5,495,359 | 2/1996 | Gertel et al. | 359/245 |
| 5,646,771 | 7/1997 | Noda | 359/245 |
| 5,880,870 | 3/1999 | Sieben et al. | 359/181 |
| 5,907,426 | 5/1999 | Kato et al. | 359/239 |
| 5,917,637 | 6/1999 | Ishikawa et al. | 359/181 |

OTHER PUBLICATIONS

United Technologies Photonics, "Use of the UTP Bias Control Circuit", received Feb. 1998 in Mountain View, California, pp. 1–9.

*Primary Examiner*—Loha Ben
*Attorney, Agent, or Firm*—Fenwick & West LLP

[57] ABSTRACT

The bias point of an electro-optic modulator, such as an Mach-Zender modulator, is automatically controlled. A pilot signal, preferably two pilot tones at different frequencies, is applied to the modulator. The output of the modulator then contains various components resulting from the pilot signal. An error signal is generated, preferably coherently, based on one of these components, termed the pilot component, which preferably is located at the difference frequency of the two pilot tones. A bias signal which controls the bias point of the modulator is adjusted based on the error signal. The coherent generation of the error signal facilitates feedback loops based on phase and/or amplitude control and also supports locking the electro-optic modulator to a bias point with a preselected slope (either negatively or positively sloping).

31 Claims, 10 Drawing Sheets

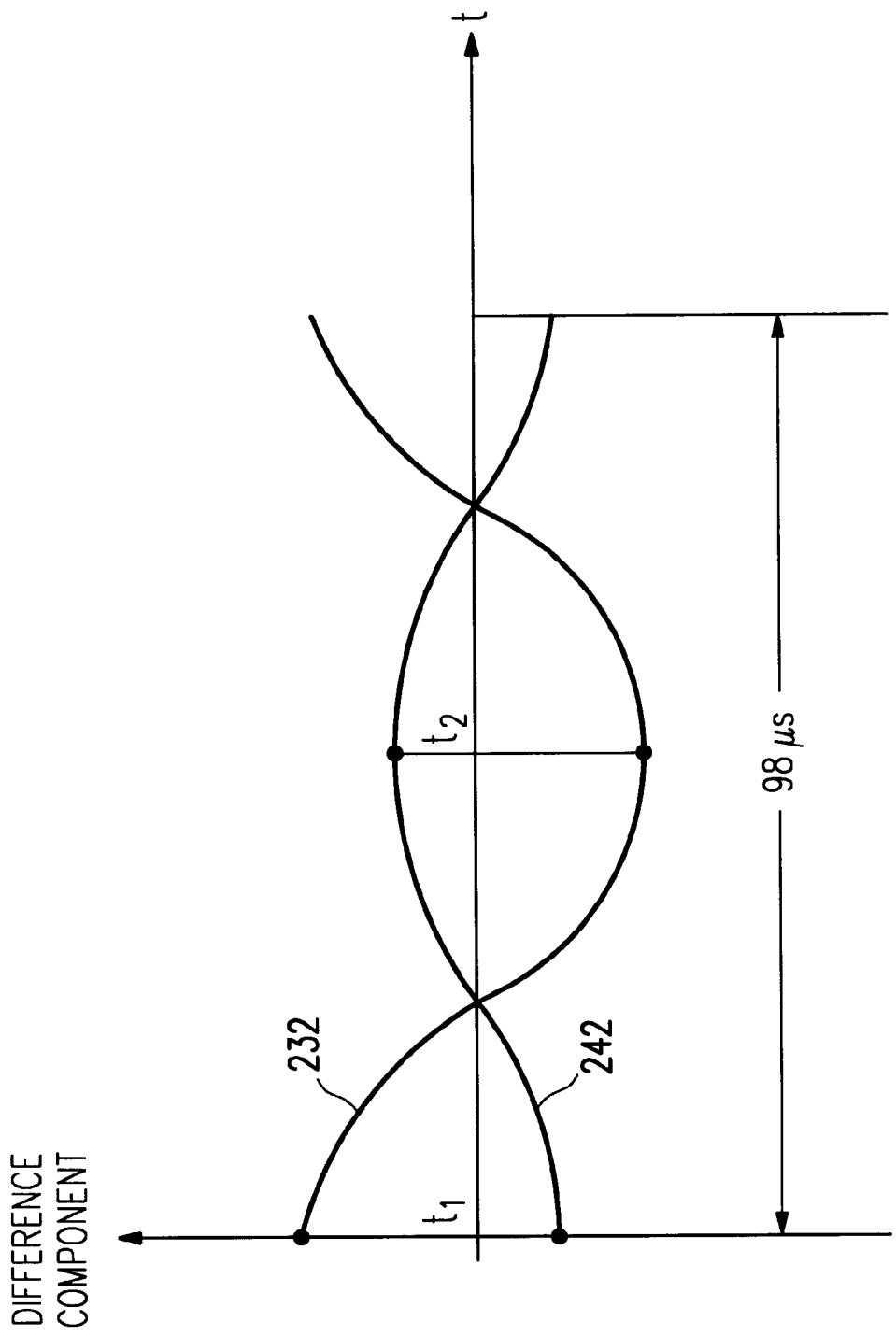

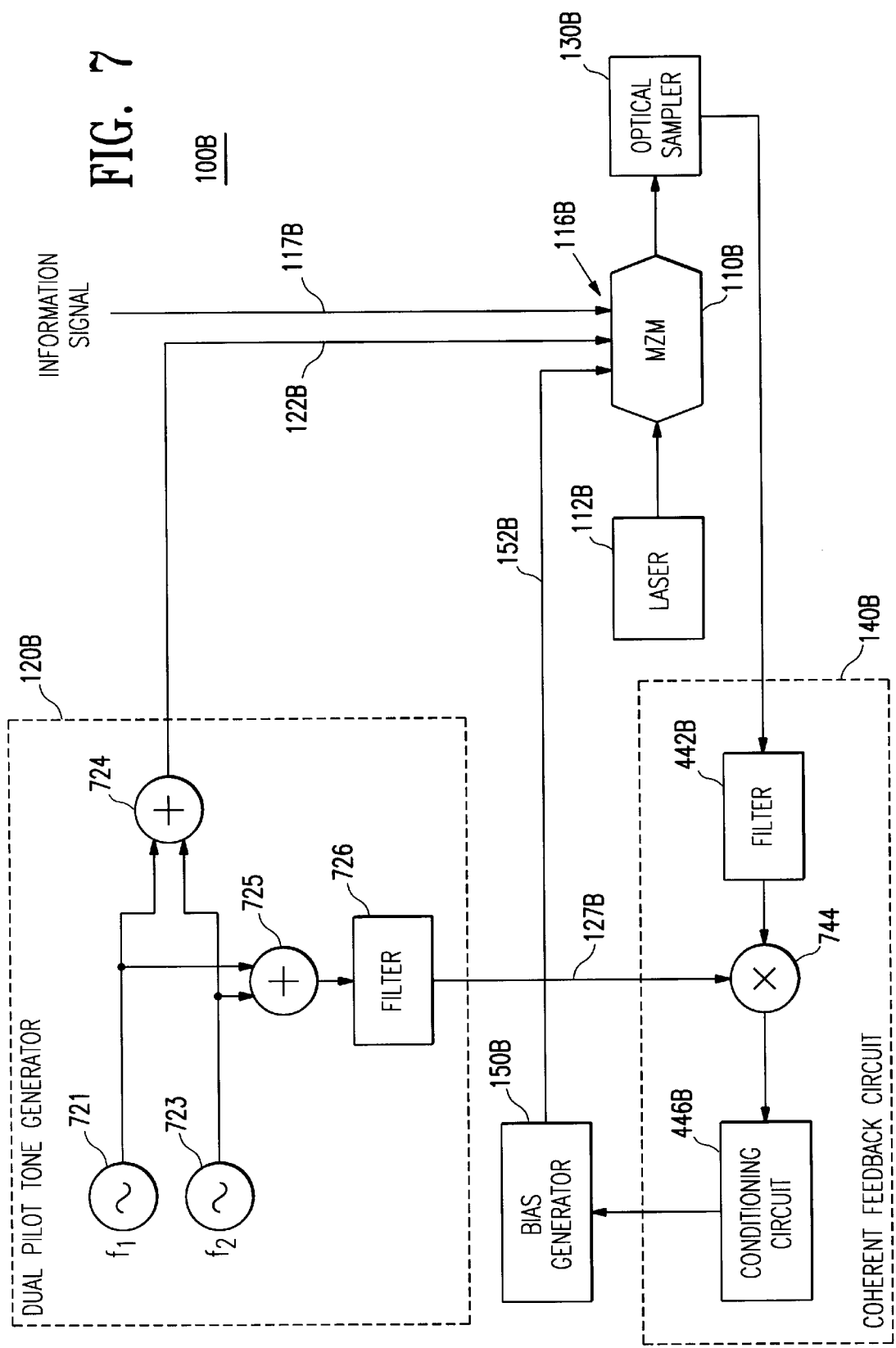

AUTOMATIC BIAS CONTROL FOR ELECTRO-OPTIC MODULATORS

BACKGROUND OF THE INVENTION

1. Field of the Invention

The present invention relates generally to the field of optical fiber communications. More specifically, the invention relates to biasing an electro-optic modulator, such as a Mach-Zender modulator, for operation within the linear region of its transfer function by applying a pair of pilot tones to the modulator's input and automatically adjusting the bias point in response to the difference component of the two pilot tones produced at the modulator's output.

2. Description of the Related Art

As the result of continuous advances in technology, particularly in the areas of networking, telecommunications, and applications which rely on networking or telecommunications, there is an increasing demand for telecommunications capacity. For example, the transmission of data over a network's trunk lines (such as the trunk lines for telephone companies or for the Internet), the transmission of images or video over the Internet, the distribution of software, the transfer of large amounts of data as might be required in transaction processing, or videoconferencing implemented over a public telephone network typically require the high speed transmission of large amounts of data, largely digital data. As applications such as the ones mentioned above become more prevalent, the demand for transmission capacity will only increase.

Optical communications systems, such as those based on optical fiber, are well-suited to meet this growing demand. Optical fiber has an inherent bandwidth which is much greater than metal-based conductors, such as twisted pair or coaxial cable. There is a significant installed base of fiber lines and protocols such as the OC protocol have been developed for the transmission of data over optical fibers. In addition, advances in transmitter and receiver technology have also resulted in improvements in optical communications systems, such as increased bandwidth utilization, lower cost systems, and more reliable service.

A typical optical communications system includes a transmitter, an optical channel (e.g., optical fiber), and a receiver. Within the transmitter, an electro-optic modulator is often used to modulate an optical carrier with the information to be transmitted. The modulated carrier is transmitted across the optical channel to the receiver, which retrieves the information from the carrier.

A common electro-optic modulator used in such systems is the Mach-Zender modulator (MZM), which operates on the principle of phase interferometry. The MZM, however, is an inherently non-linear device while many communications systems would benefit from linear operation. As a result, the MZM is often operated in a mode which minimizes the non-linear effects of its transfer function, such as second and higher order harmonics, by applying a bias signal to the MZM to establish an operating point, or bias point, in the most linear region of the MZM's transfer function and then operating the MZM over a limited range about this bias point.

The bias point, however, may vary due to temperature variations, signal fluctuations, manufacturing tolerances, aging, and other factors. In fact, since the MZM is based on phase interferometry, small changes in the environment or operation of the MZM may lead to significant changes in optical path lengths within the MZM which, in turn, will cause the bias point to drift significantly. If the proper bias point is not maintained, the MZM will exhibit stronger non-linearity, including the generation of even-order harmonics and the reduction of the signal strength. This, in turn, will decrease the maximum dynamic range of the optical communications link and will otherwise degrade the performance of the overall system. Therefore, it is important to control the bias signal applied to the modulator to ensure operation at the correct bias point.

In one approach to controlling the bias point, two pilot tones at different frequencies f1 and f2 are applied to the electro-optic modulator. The modulator mixes these two pilot tones producing at its output, among other terms, a component located at the sum frequency (f1+f2) of the two pilot tones. This sum component is tapped from the modulator output and used as feedback to control the bias point. The sum frequency (f1+f2), however, is often close in frequency to the second harmonics of the two pilot tones, which are located at (2 f1) and (2 f2). This imposes stringent requirements on the band-pass filter which must select the sum component while rejecting the two second harmonics. The necessarily narrow pass band of this filter further makes it difficult to obtain good signal to noise ratio for the recovered sum component. The sum component may also be at a high enough frequency to impose significant limitations on the electronics which must process the sum component.

In another approach, amplitude modulation is applied to the information signal being transmitted by the modulator. As a result, the optical output of the modulator is also amplitude modulated. This amplitude modulation at the output is detected and used to control the bias point. Amplitude modulation, however, introduces upper and lower sidebands. Since the information signal typically has a broad bandwidth, these upper and lower sidebands can also be quite wide. As a result, the amplitude modulation approach results in distortion of the information signal. An envelope detector is also required to detect the amplitude-modulated component.

Furthermore, both of these approaches rely on non-coherent detection techniques. For example, the approach based on the sum component typically relies on detecting only the amplitude, and not the phase, of the resulting sum component. The amplitude modulation approach typically relies on an envelope detector which also loses any phase information. Hence, in both approaches, control of the bias point can only be based on the amplitude and not the phase of the feedback signal, thus limiting the types and effectiveness of suitable control algorithms.

Thus, there is a need for approaches to controlling the bias point of electro-optic modulators, such as MZMs, which overcome the above drawbacks. In particular, there is a need for approaches based on coherent techniques, thus facilitating the use of control algorithms based on the phase as well as the amplitude of the feedback signal. There is also a need for approaches based on lower frequency feedback signals, thus relaxing requirements on the corresponding frequency filters and electronics. There is further a need for approaches with good signal to noise performance.

SUMMARY OF THE INVENTION

In accordance with the present invention, a bias control system automatically controls the bias point of an electro-optic modulator. The modulator has an electrical input, an optical input and an optical output, and modulates an optical carrier received at the optical input by an electrical signal received at the electrical input to produce a modulated optical signal at the optical output. The bias control system includes a pilot signal generator, an optical sampler, a coherent feedback circuit, and a bias generator. The pilot signal generator produces a pilot signal which is applied to the electrical input of the electro-optic modulator. The output of the modulator then contains various components resulting from the pilot signal. The optical sampler samples the output and the coherent feedback circuit coherently generates an error signal based on one of these components, termed the pilot component. The coherency is with respect to the pilot component and is facilitated by a coherency reference signal which is generated by the pilot signal generator and transmitted to the coherent feedback circuit. The error signal is used by the bias generator to adjust the bias signal applied to the modulator, thereby controlling the bias point of the modulator.

In a preferred embodiment, the pilot signal generator generates two pilot tones at different frequencies and also generates a phase reference signal synchronized with the two pilot tones. At the modulator output, the component located at the difference frequency of the two pilot tones is used as the pilot component. The coherent feedback circuit coherently generates the error signal based on the phase reference signal and the difference component.

Coherent generation of the error signal is advantageous because it can capture both the phase and amplitude information of the pilot component and, therefore, support feedback loops based on amplitude control, phase control, or a combination of the two. For example, coherent generation facilitates not only locking to a bias point but also locking to a bias point with a preselected slope (either positively or negatively sloping).

Use of the component located at the difference frequency is also advantageous because the difference component is located at a relatively low frequency, thus resulting in laxer requirements on the sharpness of any frequency filters used and the speed of any required electronics. The low frequency component is generally farther removed from any other potentially interfering frequency components, and better signal to noise ratios are also generally achievable at these lower frequencies.

A method in accordance with the invention includes the following steps. A pilot signal, preferably two pilot tones, is applied to the electrical input of the electro-optic modulator and the resulting optical output of the electro-optic modulator is sampled. A coherency reference signal based on the pilot signal is also generated. An error signal based on a pilot component in the sampled optical output, preferably the difference component, is coherently generated responsive to the coherency reference signal. A bias signal is generated responsive to the error signal; and the bias signal is applied to the elical input of the electro-optic modulator to control the bias point of the modulator.

BRIEF DESCRIPTION OF THE DRAWING

The invention has other advantages and features which will be more readily apparent from the following detailed description of the invention and the appended claims, when taken in conjunction with the accompanying drawing, in which:

FIGS. 6A–6B are graphs illustrating operation of feedback circuit 140A of system 100A;

FIG. 7 is a block diagram of an alternate embodiment 100B of system 100;

DETAILED DESCRIPTION OF THE PREFERRED EMBODIMENTS

Figure 1:
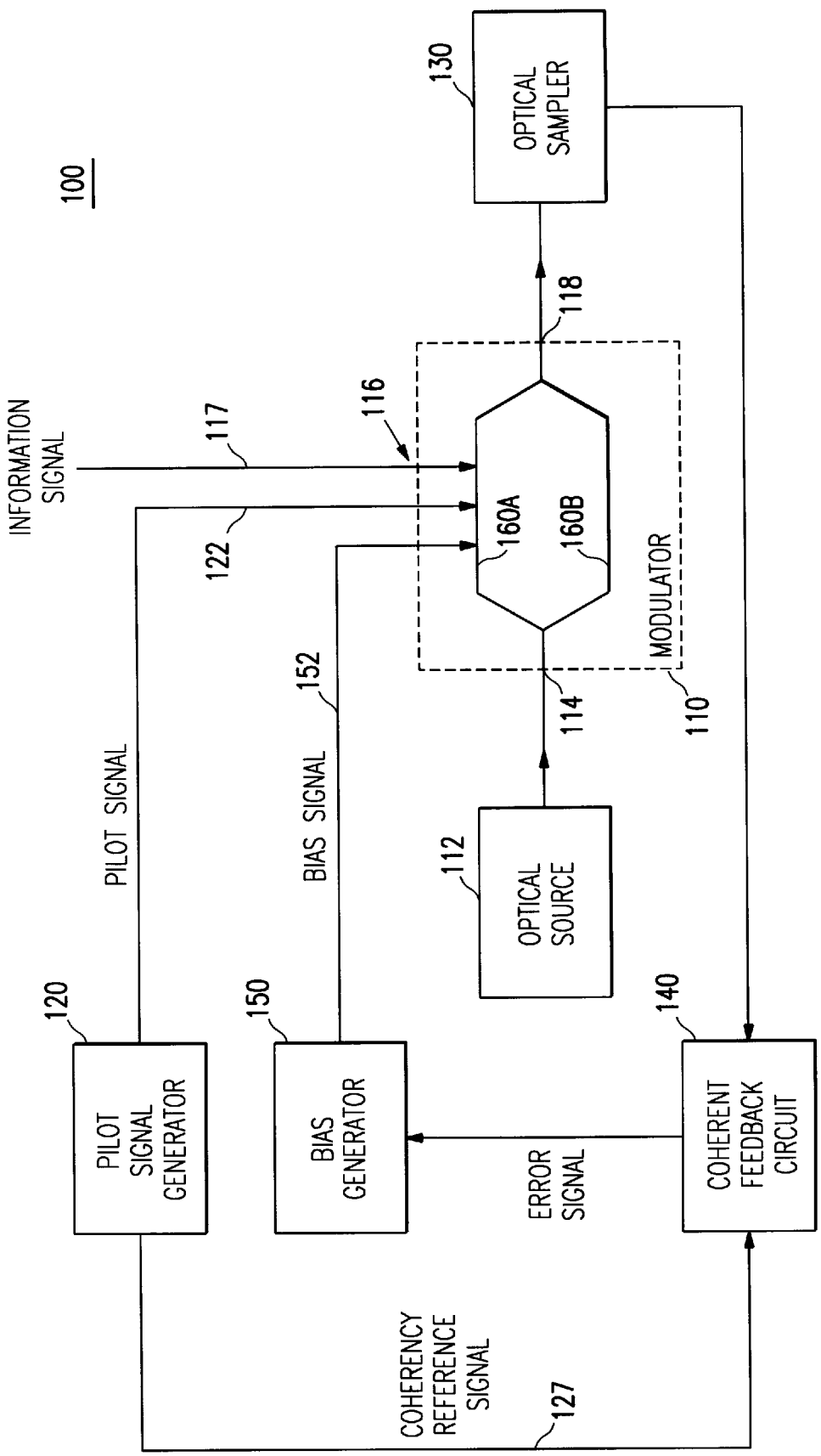
FIG. 1 is a block diagram of an electro-optic modulator system 100 in accordance with the present invention.

FIG. 1 is a block diagram of an electro-optic modulator system 100 in accordance with the present invention. System 100 includes an optical source 112 and an electro-optic modulator 110 with an optical input port 114, an electrical input port 116 and an optical output port 118. System 100 further includes a pilot signal generator 120, an optical sampler 130, a coherent feedback circuit 140, and a bias generator 150.

Optical source 112 is coupled to the optical input port 114 of electro-optic modulator 110 and the optical output port 118 of modulator 110 is coupled to the optical sampler 130 to form an optical path through system 100. In optical communications systems, the output port 118 typically will also be coupled to an optical channel, such as an optical fiber.

An electrical path for bias control of modulator 110 is formed by the following couplings. Pilot signal generator 120 is coupled to the electrical input port 116 of modulator 110. Optical sampler 130 is coupled to coherent feedback circuit 140 to bias generator 150 to the electrical input port 116 to form a feedback loop. Pilot signal generator 120 is also coupled to coherent feedback circuit 140 so that feedback circuit 140 may operate coherently with respect to signals resulting from pilot signal generator 120. The information signal to be transmitted by system 100, which is typically a modulated RF signal containing digital and/or analog data, is also received by the electrical input port 116 via line 117.

The portion of system 100 forming the optical path operates as follows. Optical source 112, for example a distributed feedback laser operating in the 1550 nm wavelength region, produces an optical carrier. Electro-optic modulator 110 receives the optical carrier at its optical input port 114 and modulates the optical carrier with the electrical signals received at electrical input port 116 to produce a modulated optical signal. This signal is transmitted through output port 118 to optical sampler 130, which samples the modulated optical signal. In a preferred embodiment optical sampler 130 is a coupler, and output port 118 is coupled to an optical waveguide which, in turn, is coupled to the coupler. The coupler extracts a small quantity of the modulated optical signal, preferably 5% or less, with the remainder continuing along the waveguide to its final destination.

In a preferred embodiment, electro-optic modulator 110 is a Mach-Zender modulator (MZM) based on lithium niobate (LiNbO3) crystal, as depicted in FIG. 1. The remainder of this description will be illustrated with reference to MZMs but the invention is not limited to these types of modulators.

For example, other interferometric modulators 110 may be constructed using fiber-based or free space optical links instead of the integrated optical waveguides of standard MZMs. Alternately, modulator 110 may be an integrated optic device like an MZM but use three or more arms rather than the two arms used in standard MZMs. Other variations will be apparent.

The standard MZM 110 operates as follows. The optical carrier from source 112 enters the MZM 110 via optical input port 114. The carrier is typically split into two signals that are coupled into separate waveguides 160A–160B (collectively, 160) formed in the crystal structure of the modulator 110. Electrodes lie in close proximity to the waveguides 160 and the electrical signals received on lines 152, 122, and 117 (i.e., via input port 116) are applied to these electrodes. In FIG. 1, input port 116 is shown as having three separate lines 152, 122, and 117. This is strictly for purposes of clarity and the invention is not limited to requiring separate electrodes for each of the three signals. The electric field produced by these electrical signals causes a local change in the refractive index of the waveguides 160, thus causing a relative phase shift between the optical carriers propagating in the two arms 160A and 160B. The relative phase shift preferably is proportional to the voltage of the applied signal. At the optical output 118 of the MZM 110, the two optical signals are recombined and coherently interfere, either destructively or constructively depending on the relative phase shift introduced in the two arms 160. resulting output at port 118 is an optical sig the intensity of which varies as a function of the voltages of the electrical signals applied to input port 116.

Figure 2:
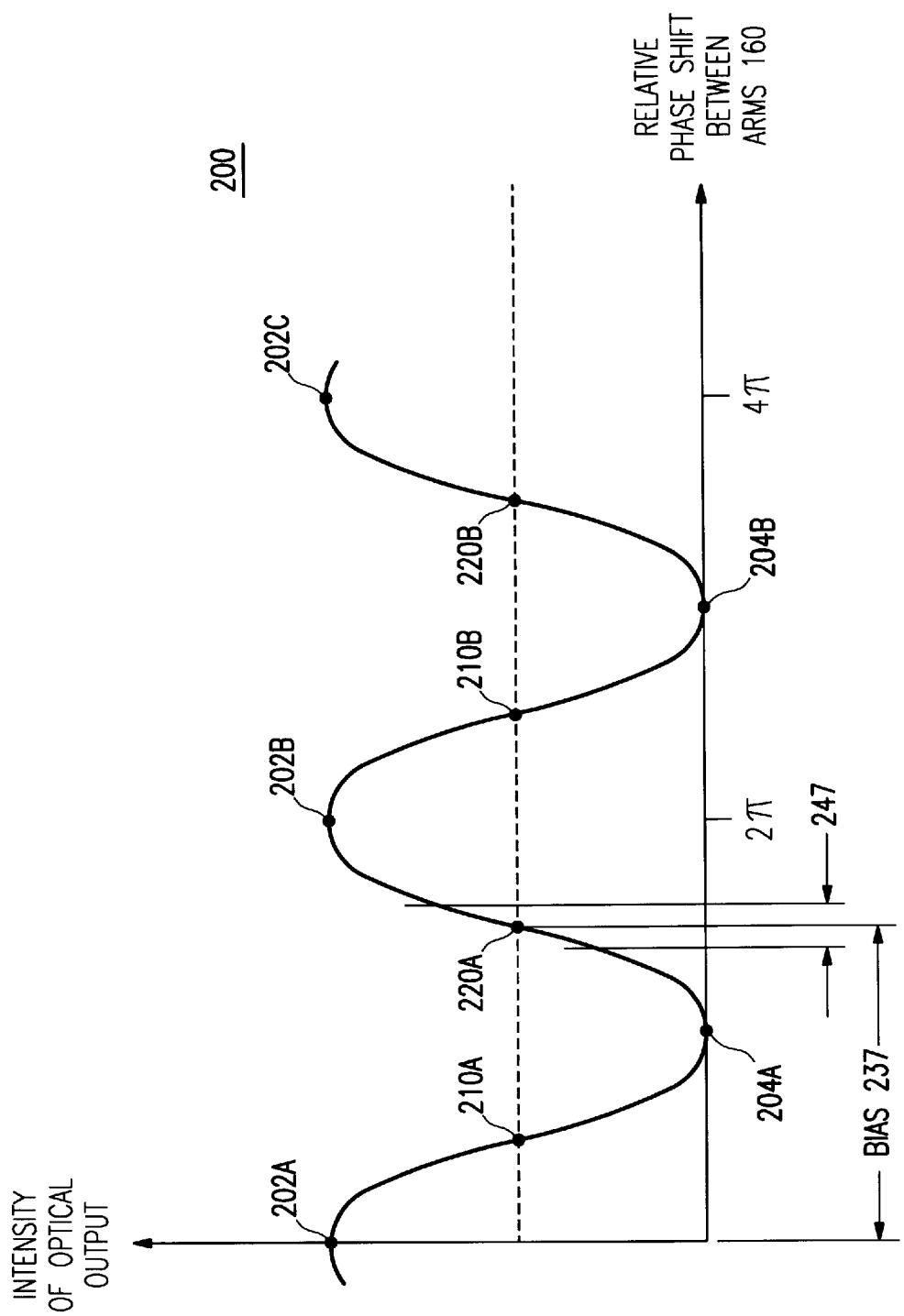
FIG. 2 is a graph illustrating a transfer function 200 for modulator 110.

FIG. 2 graphs the intensity of modulator 110's optical output as a function of the relative phase shift between the two arms 160, illustrating the transfer function 200 for modulator 110. Since modulator 110 is interferometric, the intensity of its optical output is a sinusoidal function of the relative phase shift between the two arms 160. For example, if the relative phase shift between the two arms 160 is a multiple of $2\pi$, then the carriers in the two arms will constructively interfere yielding a maximum intensity at the output, as indicated by points 202A–202C. At the other extreme, two arms 160 which are out of phase will destructively interfere yielding zero intensity at the output, as shown by points 204A–204B. The interim cases result in the sinusoidal transfer function 200 of FIG. 2. As described above, the relative phase shift is determined by the electrical signals received at input port 116 and preferably is directly proportional to the voltage of these signals. In this case, the axis labeled "Relative Phase Shift" may equivalently be interpreted as the voltages of the incoming electrical signals.

In many applications, it is desirable for modulator 110 to have a linear transfer function. One way to achieve linear operation using the inherently sinusoidal transfer function 200 is to operate modulator 110 over a limited range for which the transfer function 200 is approximately linear. The most linear sections of transfer function 200 are centered around the quadrature points 210A, 210B, etc. and 220A, 220B, etc. The quadrature points 210–220 are inflection points of the transfer function 200 and, at these points, all even harmonics are eliminated. For reasons which will be apparent below, the quadrature points 210–220 have been subdivided into the positively-sloping quadrature points 220 and the negatively-sloping points 210.

In order to operate MZM 110 in this linear mode, a bias signal sets the bias point of the modulator at one of the quadrature points 210–220. For example, if positively-sloping operation is selected, a bias signal 152 resulting in relative phase shift 237 may be selected to set the bias point at quadrature point 220A. Bias generator 150 generates this bias signal, which is applied to modulator 110 via line 152. The bias signal is sometimes referred to as a DC bias because it is near DC in frequency, but it is not strictly DC. The information signal on line 117 and pilot signal on line 122 are limited to small signal variations about the bias point 220A in order to minimize the non-linearities introduced by MZM 110. For example, MZM 110 may be limited to the operating region 247.

In order for MZM 110 to maintain this mode of operation, the bias point must be maintained at the selected quadrature point. Any deviation will introduce even-order harmonics. Furthermore, the MZM 110 is a sensitive device since any change in the relative path lengths of the two arms 160 will cause the bias point to drift. For example, the bias point typically is sensitive to changes in temperature, input signal, mechanical pressure on the MZM 110 (due to the piezoelectric nature of lithium niobate), manufacturing tolerances, and aging. Hence, precise control of the bias point is required and this control typically must be active in order to meet these stringent demands.

Figure 3:
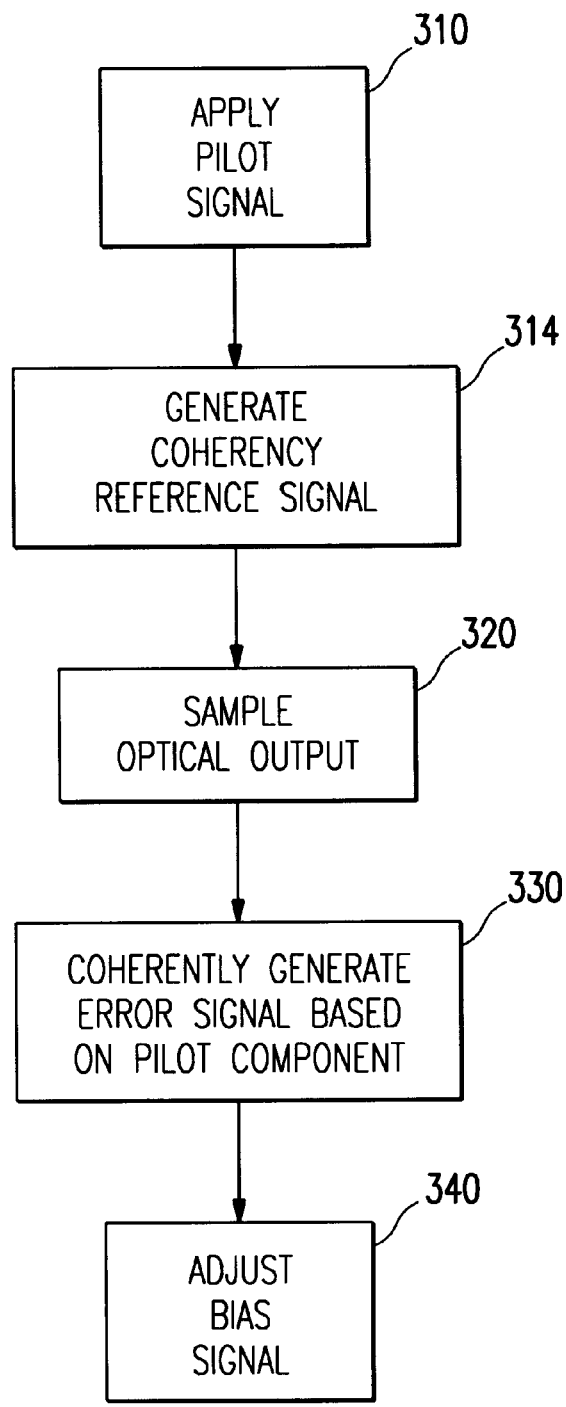
FIG. 3 is a flow diagram of a method 300 for automatically controlling the bias point of modulator 110 in accordance with the present invention.

Referring again to FIG. 1 and additionally to FIG. 3, the electrical bias control path of system 100 operates as follows to automatically control the bias point of modulator 110. The pilot signal generator 120 generates a pilot signal which is applied 310 to the modulator's electrical input port 116 via line 122. Examples of various pilot signals will be described below. The pilot signal generator 120 also generates 314 a coherency reference signal on line 127, which facilitates the coherent operation of feedback circuit 140 as will be described further below. Since the pilot signal is part of the electrical signal which modulates the optical carrier produced by optical source 112, some of the components in modulator 110's optical output are a result of the pilot signal. Some of these components, which shall be referred to as the pilot components, will be used to maintain the bias point of MZM 110.

Optical sampler 130 samples 320 the optical output, including the pilot component. The sampled output is transmitted to feedback circuit 140 which operates coherently with respect to the pilot component and coherently generates 330 an error signal based on the pilot component. The error signal is transmitted to bias generator 150, which adjusts 340 the bias signal to modulator 110 in order to maintain the selected bias point for modulator 110.

Figure 4:
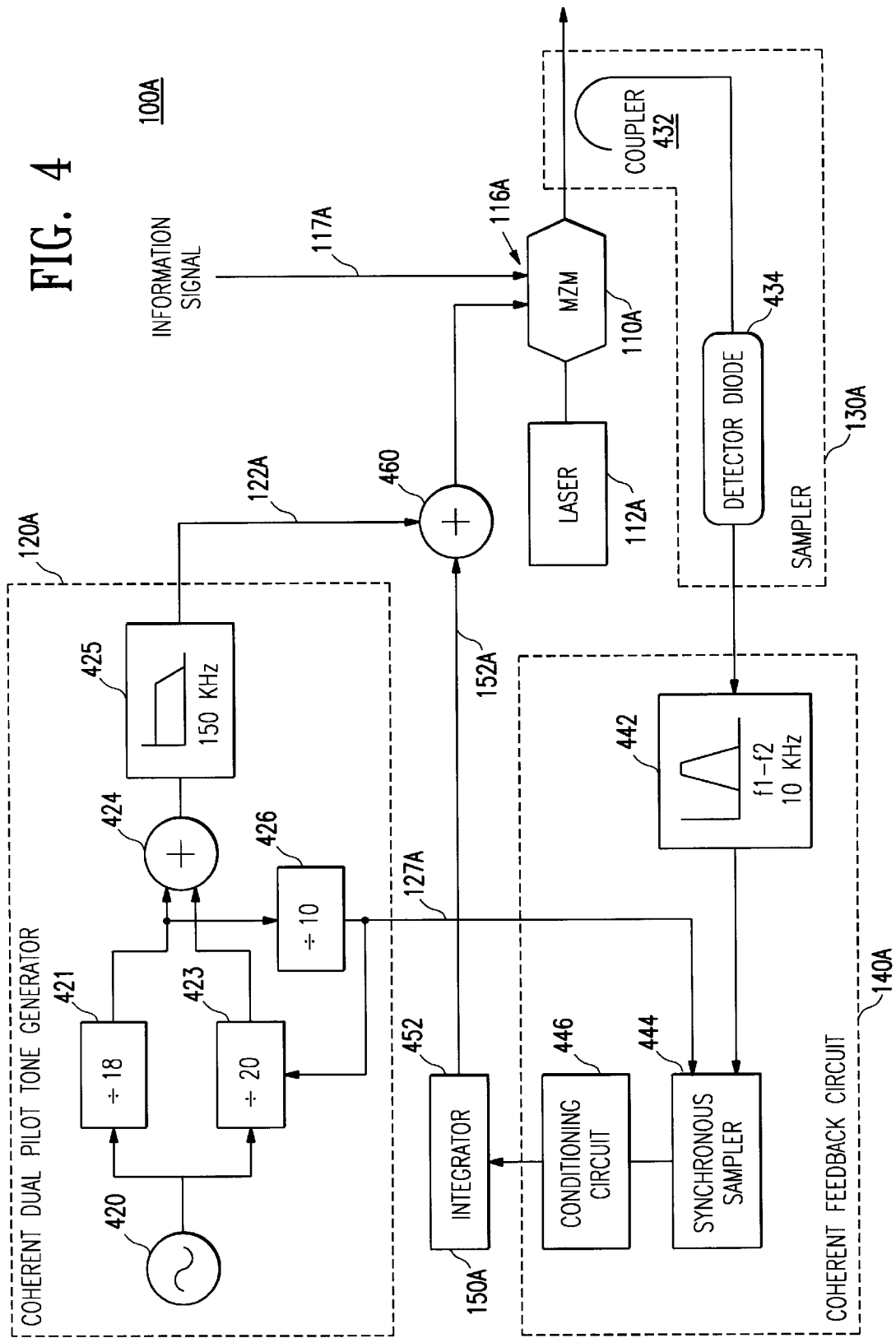
FIG. 4 is a block diagram of a preferred embodiment 100A of system 100.

FIG. 4 is a block diagram of a preferred embodiment 100A of system 100. For clarity, components in system 100A which correspond to components in system 100 are denoted with the suffix A. For example, coherent dual pilot tone generator 120A in system 100A is the counterpart to pilot signal generator 120 of system 100. In system 100A, optical source 112A is a laser and electro-optic modulator 110A is an MZM. System 100A also includes a dual pilot tone generator 120A, optical sampler 130A, coherent feedback circuit 140A, and bias generator 150A, each of which shall be further described below. System 100A further includes a signal combiner 460.

Dual pilot tone generator 120A includes a reference oscillator 420, two frequency dividers 421 and 423, a signal combiner 424, a low-pass filter 425, and a third frequency divider 426. The dual pilot tone generator 120A has two outputs, one coupled to line 122A for transmitting the two pilot tones to MZM 110A and an additional output coupled to line 127A for transmitting the coherency reference signal to coherent feedback circuit 140A. The various elements are coupled as follows. The reference oscillator 420 is coupled to frequency divider 421 which is coupled to combiner 424. Similarly, reference oscillator 420 is also coupled to frequency divider 423 which is coupled to combiner 424. Combiner 424 is coupled to low pass filter 425 which in turn is coupled to line 122A. The output of frequency divider 421 is also coupled to the input of frequency divider 426, the output of which is coupled both to line 127A and to an input for frequency divider 423.

Dual pilot tone generator 120A operates as follows. Reference oscillator 420 generates a 1.836 MHz reference clock which is frequency divided by 18 and 20, respectively, by frequency dividers 421 and 423 to generate 102 KHz and 91.8 KHz signals which will form the basis for a pilot signal containing two pilot tones. Combiner 424 combines these two signals into a single signal and filter 425 low pass filters this signal with a cutoff frequency of 150 KHz to reduce the higher order harmonics. This results in a single signal on line 122A which contains two pilot tones at frequencies f1=102 KHz and f2=91.8 KHz. The pilot tones are coherent with each other and preferably are narrow band enough and have good enough frequency stability to allow detection of their non-linear products. The pilot tones need not be pure sinusoids since the higher harmonic frequencies will not generate interfering effects for purposes of system 100A. In a preferred embodiment, the reference oscillator 420 and frequency dividers 421 and 423 are digital counter circuits, and their outputs are 1.836 MHz, 102 KHz and 91.8 KHz square waves, respectively.

In addition, for reasons explained below, dual pilot tone generator 120A also maintains a consistent phase relationship between the two pilot tones. This is achieved by frequency divider 426 and will be explained with reference to FIG. 5, which is a timing diagram of various signals within dual pilot tone generator 120A. Square waves 521 and 523 are the 102 KHz and 91.8 KHz signals produced by frequency dividers 421 and 423. The periods of these two square waves 521 and 523 are slightly different and, therefore, the relative phase shifts between the two square waves varies as a function of time. However, since the two square waves 521 and 523 are generated by frequency dividing common reference oscillator 420 by 18 and 20, the two signals are coherent with each other and the relative phase shift between the two signals will also be periodic but with a much lower fundamental frequency. Specifically, the relative phase shift will cycle once for every ten cycles of square wave 521 or, equivalently, for every nine cycles of square wave 523. This yields a fundamental frequency for the relative phase shifts of 102 KHz/10=91.8 KHz/9=10.2 KHz or a fundamental period of 98 μs. In other words, once every 98 μs, the leading edge of both square waves 521 and 523 will occur at precisely the same time. For example, in FIGS. 5A and 5B, leading edge 531 is aligned with leading edge 534 at time 541 and again, 98 μs later, at time 543.

Figure 5:
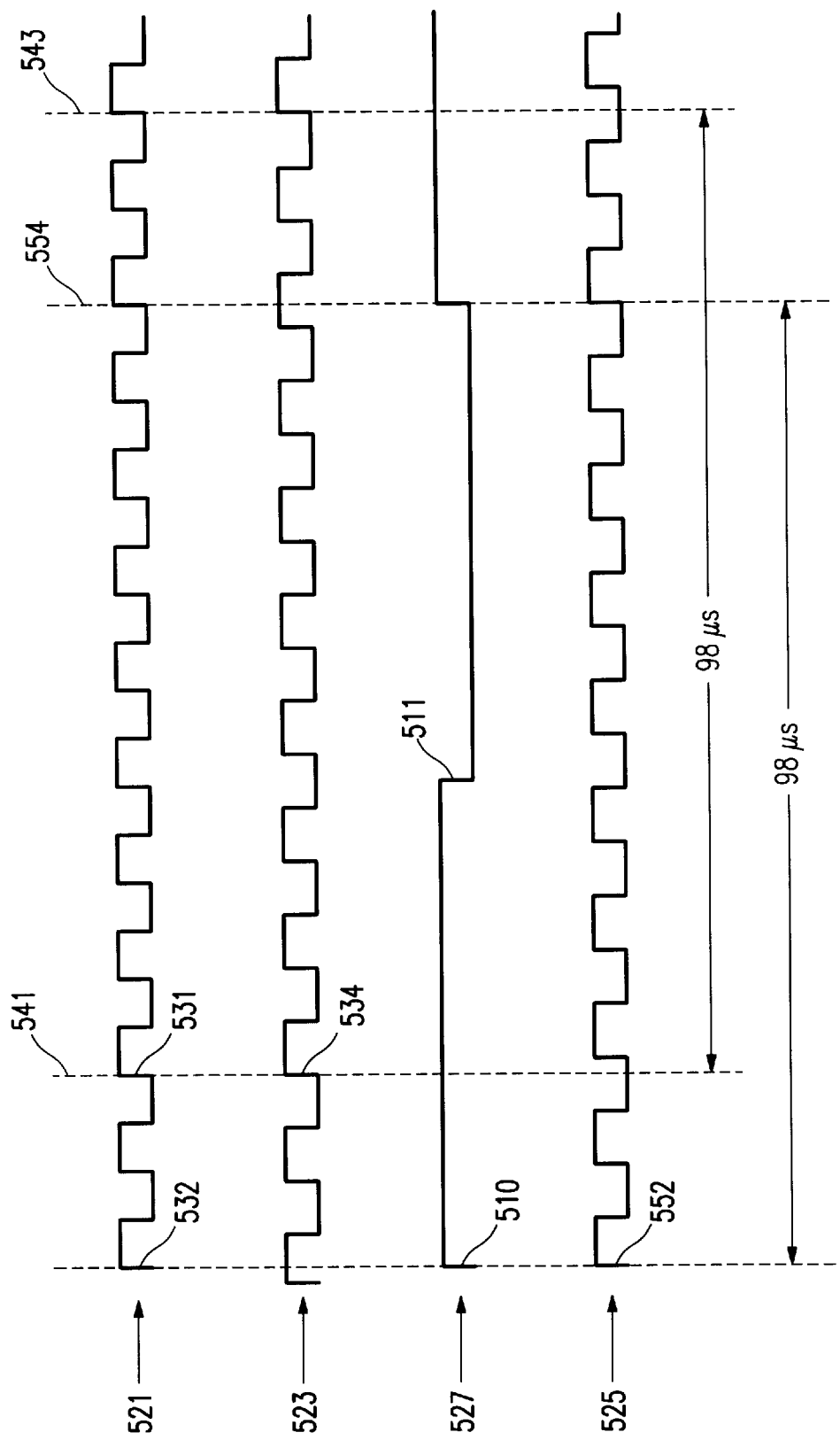
FIG. 5 is a timing diagram illustrating operation of dual pilot tone generator. 120A of system 100A.

Dual pilot tone generator 120A indicates when this alignment occurs via the coherency reference signal (specifically, a phase reference signal in this embodiment) on line 127A. More specifically, frequency divider 426 divides the 102 KHz square wave 521 by 10 to produce a phase reference signal 527 which is a square wave with frequency 10.2 KHz, as shown in FIG. 5. The leading edge 510 of the reference square wave 527 is selected as the point in time when the leading edges of square waves 521 and 523 should be aligned. The leading edge 532 of the 102 KHz square wave 521 is automatically aligned with leading edge 510 of reference square wave 527 due to the manner in which the reference square wave 527 is generated. However, this may not be true for the 91.8 KHz square wave 523. For example, the square wave 523 in FIG. 5 does not have a leading edge aligned with leading edge 510 of reference square wave 527. To remedy this situation, the leading edge 510 of the reference square wave 527 is used as a reset for frequency divider 423, thus producing a 91.8 KHz square wave 525 with leading edge 552 aligned with leading edge 510 of the reference square wave 527. The alignment of leading edges 532, 510 and 552 repeats every 98 μs, for example at time 554 in FIG. 5. The phase reference signal 527 is also transmitted via line 127 to the feedback circuit 140 to provide a phase reference for the feedback circuit. Note that the frequency of phase reference signal 527 is the same as the difference frequency (i.e., f1−f2) of the two pilot tones. This is preferable but not required.

Referring again to FIG. 4, optical sampler 130A includes a coupler 432 coupled to a detector diode 434. The coupler 432 taps a small portion of the optical output from MZM 110A, with the remainder of the optical output typically coupled to an optical fiber. The detector diode 434 produces a photocurrent proportional to the intensity of the tapped portion. In system 100A, this photocurrent is described by $$\text{Photocurrent} \propto 1+\cos\left[\phi b+x(t)\right] \tag{Eqn. 1}$$

where $\propto$ is the proportionality sign, $\phi b$ is the relative phase shift due to the bias signal on line 152A (and phase drifts due to temperature fluctuations, aging, etc.) and $x(t)$ is the relative phase shift due to the information signal and pilot tones on lines 117 and 122A, respectively. Expanding Eqn. 1 in a Taylor series yields $$\text{Photocurrent} \propto [1+\cos(\phi b)]-x(t)\sin(\phi b)-\tfrac{1}{2}x^2(t)\cos(\phi b)+\text{higher order terms in } x(t) \tag{Eqn. 2}$$

The linear mode of operation described previously occurs when the $x^2(t)$ term (i.e., the second order term) is eliminated. This can be achieved by controlling the bias signal such that $\phi b=(m+\tfrac{1}{2})\pi$ where m is an integer, thus yielding $\cos(\phi b)=0$ and eliminating the second order term.

In system 100A, $$x(t)=a1\sin(2\pi f1 t)+a2\sin(2\pi f2 t)+s(t) \tag{Eqn. 3}$$

where a1 and a2 are constants, and f1 and f2 are the frequencies of the two pilot tones. The first two terms are the relative phase shifts due to the two pilot tones and s(t) is the phase shift due to the information signal. Substituting Eqn. 3 into the second order term of Eqn. 2 yields an expression with components at many different frequencies including, for example, the second harmonics of the pilot tones (2 f1 and 2 f2), the sum frequency of the pilot tones (f1+f2), the difference frequency of the pilot tones (f1−f2), the frequencies in the information signal, and all intermodulation products produced by the non-linearities of the MZM 110A. Various of these components may be used as the pilot component and the second order components are preferred for this purpose. In system 100A, the component at the difference frequency (i.e., the difference component) is selected as the pilot component and is described by $$\text{Difference component} \propto \cos\left[2\pi(f1-f2)t\right]\cos(\phi b) \tag{Eqn. 4}$$

Note that this difference component can be driven to zero by setting $\cos(\phi b)=0$, which is exactly the same condition required to operate MZM 110A in its linear mode.

Feedback circuit 140A and bias generator 150A implement this functionality. That is, they generate the bias signal required for operation of MZM 110A in its linear mode based on zeroing the difference component of Eqn. 4.

More specifically, feedback circuit 140A includes a frequency filter 442, a synchronous sampler 444, and a conditioning circuit 446, which are coupled to each other in that order. Frequency filter 442 selects the difference component. In system 100A, the difference frequency is (f1−f2)=10.2 KHz and filter 442 has a pass band centered at this frequency. Note that the frequency requirements for this filter 442 are much relaxed compared to the comparable filter required for a system based on the sum component. The sum component would be located at f1+f2=193.8 KHz and the corresponding filter would have to pass this component while simultaneously rejecting the second harmonics located at 2 f1=204 KHz and 2 f2=183.6 KHz.

Figure 6A:
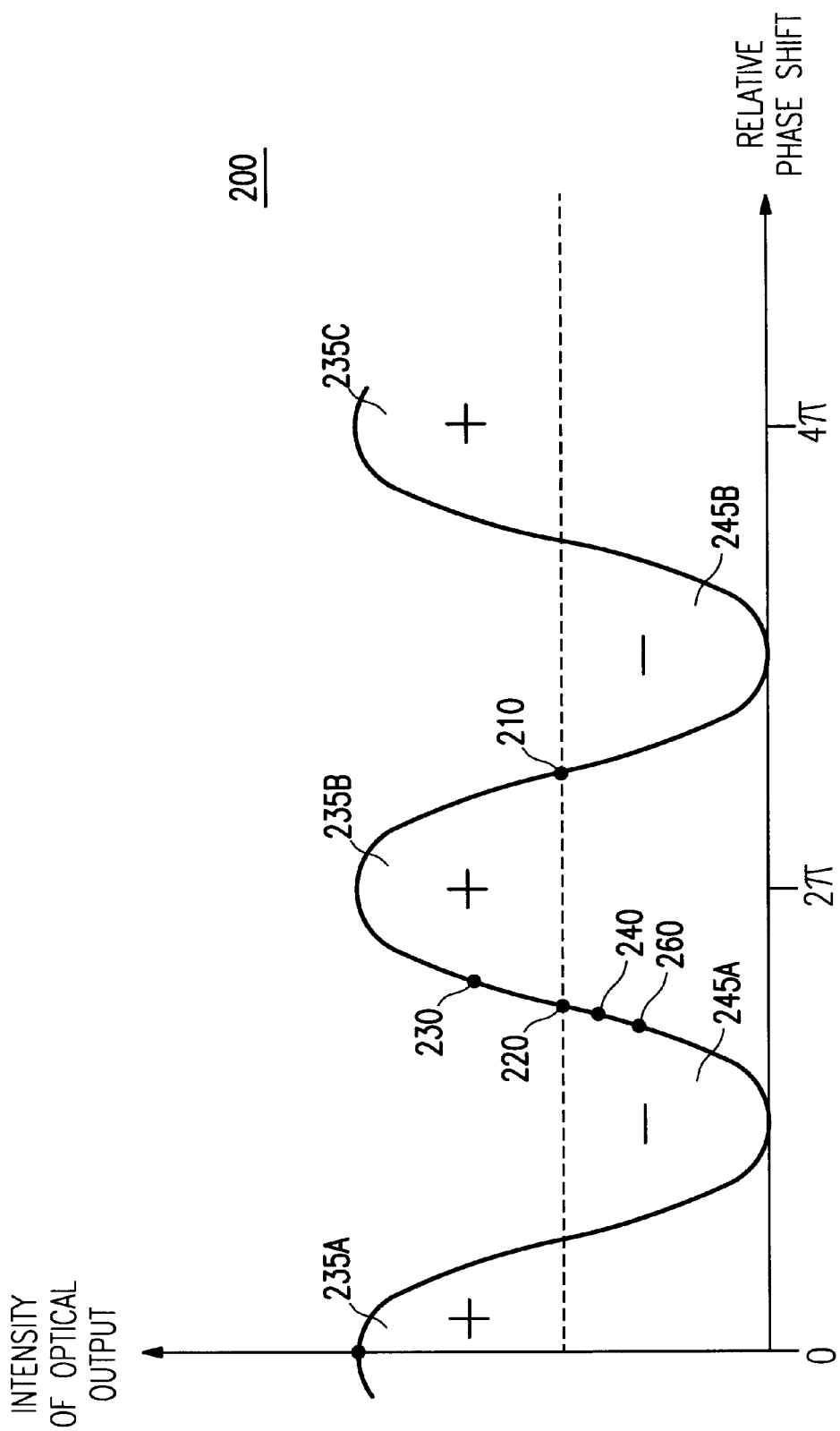

FIGS. 6A–6B are graphs illustrating operation of the remainder of feedback circuit 140A. FIG. 6A is the transfer function 200 shown in FIG. 2. Assume for the moment that the desired bias point is a positive sloping bias point 220. If the actual bias point is 230, then the difference component of Eqn. 4 will take the form 232 as shown in FIG. 6B. On the other hand, if the actual bias point is 240, the difference component will take the form 242 of FIG. 6B. In general, the difference component is a sinusoid at the difference frequency (10.2 KHz or a period of 98 µs in this case), with the amplitude of the sinusoid determined by the deviation of the actual bias point 230 or 240 from the nearest quadrature point (220 in this case). For example, point 230 is farther away from quadrature point 220 than is point 240 so the amplitude of corresponding if difference component 232 is greater than that for difference component 242. Finally, the polarity of the difference component depends on whether the actual bias point falls in one of the positive regions 235A, 235B, etc., or one of the negative regions 245A, 245B, etc. For example, point 230 falls in positive region 235B; while point 240 falls in negative region 245A. Therefore, the corresponding difference components 232 and 242 are 180 degrees out of phase with each other.

The amplitude and polarity of the difference component are captured by synchronously sampling the difference component. In one embodiment, synchronous sampler 444 samples the difference component at time t1 with respect to each period of the difference component. The resulting sample values capture the peak values of the difference component and reflect both the amplitude and polarity of the difference component. Synchronous sampler 444 achieves the appropriate timing by sampling the difference component synchronously with the phase reference signal 527 received from dual pilot tone generator 120A. For example, the time t1 in FIG. 6B corresponds to the leading edge 510 of phase reference signal 527 in FIG. 5 since phase reference signal 527 has the same frequency as difference components 232 and 242. Other sample times, types of phase reference signals, and methods for synchronizing samples will be apparent. For example, difference components 232 and 242 may be sampled multiple times during each period or only once for every several periods.

Conditioning circuit 446 converts the samples to an error signal using any of a variety of standard techniques. For example, if the feedback circuit is based on proportional control, the error signal would be proportional to both the polarity and amplitude of the samples. Alternately, if bang-bang control is used, the error signal would be based only on the polarity of the samples. In addition, if multiple samples are taken during each period then some preprocessing of the samples may be appropriate. For example, if samples are taken both at times t1 and t2 in FIG. 6B (corresponding to leading edge 510 and falling edge 511 of phase reference signal 527), the t2 samples may be inverted in order to be consistent with the t1 samples. The error signal produced by conditioning circuit 446 is transmitted to bias generator 150A which in this embodiment includes an integrator 452. The integrator 452 integrates the error signal to produce the corresponding bias signal on line 152A and also serves to filter out any jitter or transient noises. Other types of error signals and feedback loops will be apparent.

Conditioning circuit 446 can also generate error signals to maintain a bias point with a specific slope. For example, if a positive sloping bias point 220 is preselected, conditioning circuit 446 will generate one set of error signals while a different set will be generated if a negative sloping bias point 210 is preselected. For example, if the actual bias point is at 230, preselecting a positive sloping bias point 220 will result in an error signal which reduces the bias signal while preselecting a negative sloping bias point 210 will require an increase in the bias signal. Hence, by synchronously sampling the difference component, feedback circuit 140A is capable of not only controlling the bias point of modulator 110A but also of selecting whether the bias point is positively or negatively sloping.

In embodiment 110A, lines 122A and 152A are coupled to a combiner 460, the output of which is coupled to the electrical input port 116A of MZM 110A. Combiner 460 combines the bias signal and the two pilot tones on lines 122A and 152A into a single composite signal which is applied to one of the electrodes of MZM 110A. This is primarily done for convenience since most standard MZMs 110 include only two electrodes, one for the bias signal and one for the actual information signal. Hence, the two pilot tones are combined with the bias signal and applied to the bias electrode. However, this is not a limitation of the invention. For example, the two pilot tones could have been combined with the information signal and supplied to MZM 110A via the information signal electrode. Alternately, an MZM 110A with three electrodes could have been used, one each for the bias signal, two pilot tones, and information signal. As another alternative, each of the two pilot tones could be applied through a separate electrode.

FIG. 7 is a block diagram of an alternate embodiment 100B of system 100. Corresponding components will be denoted with the suffix B, consistent with the notation of FIG. 4. For purposes of clarity, the description of system 100B will focus on the dual pilot tone generator 120B and the feedback circuit 140B. The remainder of the system 100B is similar in operation to the previous systems 100 and 100A and the remarks for those systems apply to system 100B.

Dual pilot tone generator 120B includes two pilot tone sources 721 and 723, a combiner 724, a multiplier 725, and a filter 726. Each pilot tone source 721 and 723 is coupled to an input of combiner 724 and an input of multiplier 725. The output of combiner 724 is coupled to the electrical input port 116B of MZM 110B. The output of multiplier 725 is coupled to feedback circuit 140B via filter 726 and line 127B.

Each of the sources 721 and 723 generates one of two pilot tones which need not be coherent in system 100B. The two pilot tones are combined by combiner 724 and then applied to MZM 110B. Structure and operation of this portion of the dual pilot tone generator 120B is similar to embodiments previously described. For example, combiner 724 may be followed by frequency filtering elements to clean up the pilot tones applied to modulator 110B.

The coherency reference signal on line 127B, however, is produced using a different structure and approach. In particular, the two pilot tones from sources 721 and 723 are multiplied together by multiplier 725 to produce a signal which contains a component at the difference frequency. This component is filtered by filter 726 and serves as a coherency reference signal on line 127B. Like the coherency reference signal in system 100A, this signal contains sufficient information to synchronize the feedback circuit 140B with the difference component in the output of MZM 110B.

Feedback circuit 140B is similar to feedback circuit 140A, but synchronous sampler 444 is replaced by a multiplier 744. Multiplier 744 receives the difference component from filter 442B and multiplies it against the coherency reference signal on line 127B. This generates a DC component with amplitude and polarity proportional to the amplitude and polarity of the difference component and therefore containing the same information as the samples produced by synchronous sampler 444. Conditioning circuit 446B then produces an error signal based on this DC component.

Figure 8:
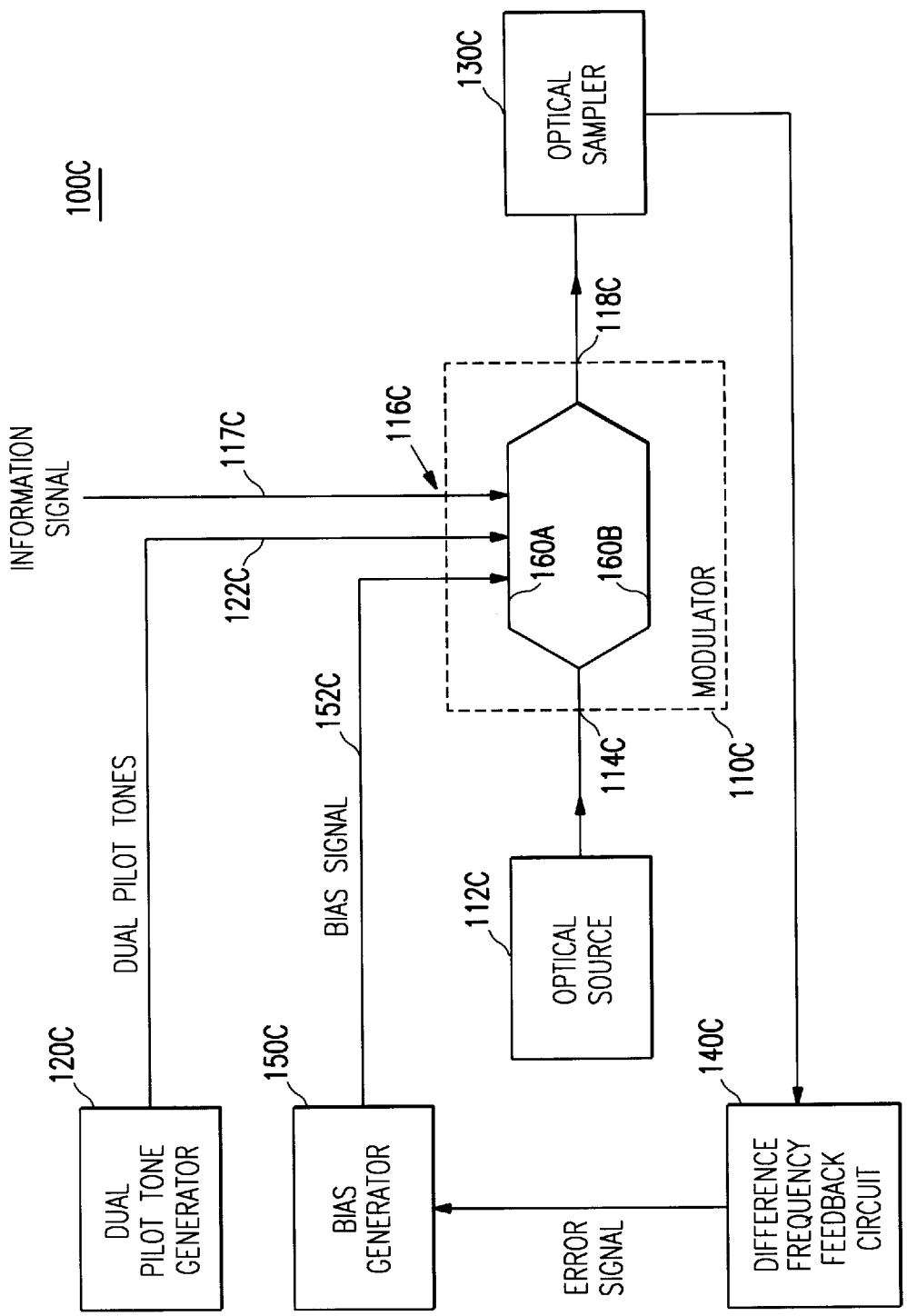
FIG. 8 is a block diagram of another electro-optic modulator system 100C in accordance with the present invention.

FIG. 8 is a block diagram of another electro-optic modulator system 100C in accordance with the present invention. System 100C has the same components coupled in the same manner as system 100, but with the following differences. First, pilot signal generator 120 is replaced by dual pilot tone generator 120C which produces dual pilot tones on line 122C. Second, coherent feedback circuit 140 is replaced by difference frequency feedback circuit 140C, which generates an error signal based on the difference component but does not do so coherently. Third, since feedback circuit 140C does not operate coherently with respect to the difference component, there is no need for line 127 which is used to transmit the coherency reference signal.

Figure 9:
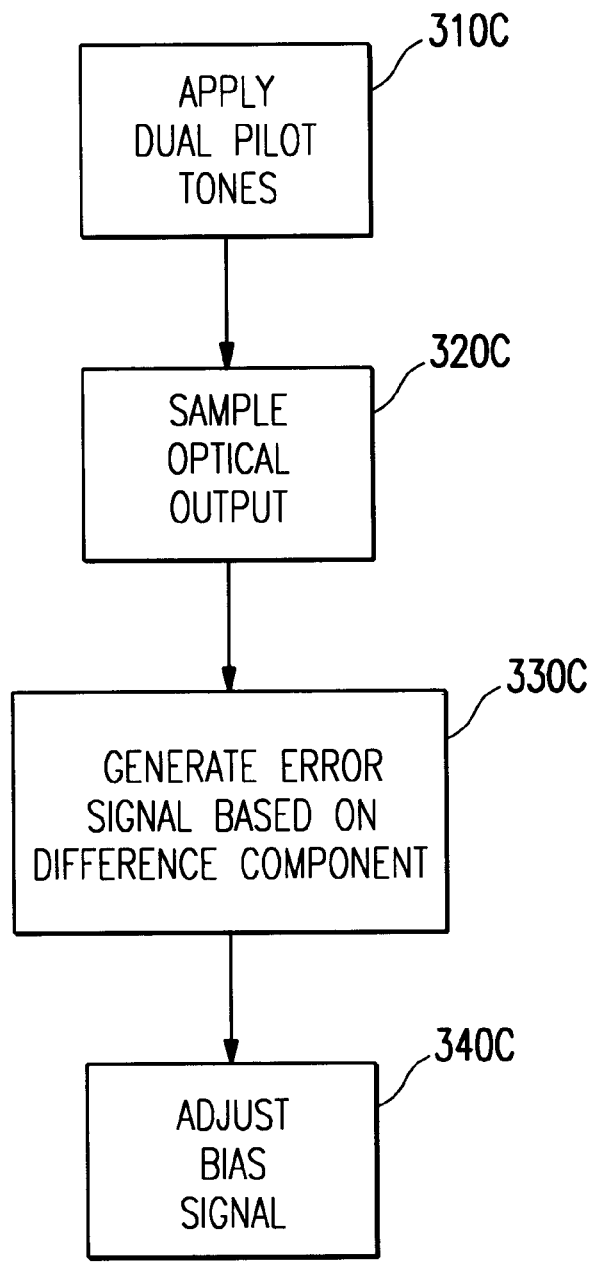
FIG. 9 is a flow diagram of a method 300C for automatically controlling the bias point of modulator 100C in accordance with the present invention.

FIG. 9 is a flow diagram of a method 300C for automatically controlling the bias point of modulator 110C in accordance with the present invention. The dual pilot tone generator 120C generates two pilot tones at two different frequencies, denoted f1 and f2, which are applied 310C to the modulator's electrical input port 116C via line 122C. Modulator 110C's optical output then includes a difference component at the difference frequency (f1−f2) of the two pilot tones. Optical sampler 130C samples 320C the optical output, including the difference component. The sampled output is transmitted to difference frequency feedback circuit 140C which generates 330C an error signal based on the difference component in the sampled optical output. The error signal is transmitted to bias generator 150C, which adjusts 340C the bias signal to modulator 110C in order to maintain the selected bias point for modulator 110C.

Since feedback circuit 140C does not operate coherently with respect to the difference component, it cannot directly detect the polarity of the difference component. However, system 100C can still maintain a bias point of a preselected slope. For example, referring to FIG. 6A, feedback circuit 140C cannot distinguish between the difference components produced by bias points 230 and 260 since these two difference components have the same amplitude. However, if bias generator 150C increases the bias signal and the resulting difference component decreases in amplitude (e.g., because the bias point moves from 260 to 240), then system 100C can determine that the original bias point was 260 rather than 230 and can lock the bias point to one with a specific slope.

Although the invention has been described in considerable detail with reference to certain preferred embodiments thereof, other embodiments are possible. For example, some or all of the functionality described above may be implemented in software running on processors, either general processors or dedicated processors such as microcontrollers or digital signal processors. Therefore, the scope of the appended claims should not be limited to the description of the preferred embodiments contained herein.

What is claimed is:

1. A bias control system for automatically controlling a bias point of an electro-optic modulator, wherein the electro-optic modulator has an electrical input, an optical input and an optical output, for modulating an optical carrier received at the optical input by an electrical signal received at the electrical input to produce a modulated optical signal at the optical output, the bias control system comprising:

a pilot signal generator for generating a pilot signal applicable to the electrical input of the electro-optic modulator and further for generating a coherency reference signal;

an optical sampler for sampling the optical output of the electro-optic modulator, wherein the sampled optical output includes a pilot component resulting from the pilot signal;

a coherent feedback circuit coupled to the optical sampler and to the pilot signal generator for coherently generating an error signal based on the coherency reference signal and on the pilot component in the sampled optical output; and a bias generator coupled to the coherent feedback circuit for generating a bias signal responsive to the error signal, the bias signal applicable to the electrical input of the electro-optic modulator for controlling the bias point of the electro-optic modulator.

2. The bias control system of claim 1 wherein:

the pilot signal generator comprises a coherent dual pilot tone generator for generating first and second pilot tones applicable to the electrical input of the electro-optic modulator, the first and second pilot tones coherent with each other and characterized by first and second frequencies, respectively;

the coherency reference signal comprises a phase reference signal synchronized with the first and second pilot tones;

the pilot component results from the first and second pilot tones; and the coherent feedback circuit is further for coherently generating the error signal based on the phase reference signal and on the pilot component.

3. The bias control system of claim 2 wherein the dual pilot tone generator comprises:

a reference oscillator for generating a periodic signal;

a first frequency divider coupled to the reference oscillator for frequency dividing the periodic signal by a first factor to generate the first pilot tone; and a second frequency divider coupled to the reference oscillator for frequency dividing the periodic signal by a second factor to generate the second pilot tone.

4. The bias control system of claim 3 wherein:

the reference oscillator includes a digital reference oscillator for generating a reference clock;

the first frequency divider frequency divides the reference clock by a first integer to generate a first digital signal characterized by the first frequency;

the second frequency divider frequency divides the reference clock by a second integer to generate a second digital signal characterized by the second frequency; and the dual pilot tone generator further comprises a third frequency divider coupled to the first frequency divider for frequency dividing the first digital signal by a third integer to generate the coherency reference signal.

5. The bias control system of claim 2 wherein the coherent feedback circuit comprises:
   a synchronous sampler coupled to the optical sampler for synchronously sampling the pilot component, and
   a conditioning circuit coupled to the synchronous sampler for generating the error signal responsive to the sampled pilot component.

6. The bias control system of claim 5 wherein:
   the pilot component is periodic; and
   the synchronous sampler samples the pilot component at a predetermined time within the period of the pilot component.

7. The bias control system of claim 6 wherein:
   the synchronous sampler samples the pilot component at a first and a second predetermined time within the period of the pilot component; and
   the conditioning circuit compensates for differences in the samples due to differences between the first and second predetermined times.

8. The bias control system of claim 5 wherein:
   the synchronous sampler samples the pilot component at a peak value of the pilot component.

9. The bias control system of claim 2 wherein:
   the pilot component comprises a second order component.

10. The bias control system of claim 9 wherein:
    the second order component comprises a difference component.

11. The bias control system of claim 1 wherein:
    the coherent feedback circuit coherently generates the error signal further responsive to a preselected slope of the bias point; and
    the bias signal is further for maintaining the bias point of the electro-optic modulator at a bias point with the preselected slope.

12. The bias control system of claim 1 wherein:
    the pilot signal generator comprises:
      a dual pilot tone generator for generating first and second pilot tones applicable to the electrical input of the electro-optic modulator, the first and second pilot tones characterized by first and second frequencies, respectively, and
      a first multiplier for multiplying together the first and second pilot tones to generate the coherency reference signal;
    the pilot component results from the first and second pilot tones and is characterized by a pilot component frequency, wherein the coherency reference signal is further characterized by the pilot component frequency; and
    the coherent feedback circuit comprises a second multiplier coupled to the first multiplier and the optical sampler for multiplying the coherency reference signal by the pilot component to produce the error signal.

13. The bias control system of claim 1 wherein:
    the coherent feedback circuit coherently generates the error signal responsive to a polarity of the pilot component.

14. An electro-optic modulator system with automatic bias control comprising:
    a pilot signal generator for generating a pilot signal and for generating a coherency reference signal;
    an electro-optic modulator having an electrical input, an optical input and an optical output, the electrical input coupled to the pilot signal generator, the electro-optic modulator for modulating an optical carrier received at the optical input by the pilot signal to produce a modulated optical signal at the optical output, wherein the modulated signal includes a pilot component;
    an optical sampler coupled to the optical output of the electro-optic modulator, for sampling the optical output;
    a coherent feedback circuit coupled to the optical sampler and to the pilot signal generator for coherently generating an error signal based on the coherency reference signal and on the pilot component;
    a bias generator coupled to the coherent feedback circuit and to the electrical input of the electro-optic modulator, for generating a bias signal responsive to the error signal and applying the bias signal to the electrical input of the electro-optic modulator for controlling a bias point of the electro-optic modulator.

15. The electro-optic modulator system of claim 14 wherein:
    the pilot signal generator comprises a coherent dual pilot tone generator for generating first and second pilot tones coherent with each other and characterized by first and second frequencies, respectively;
    the coherency reference signal comprises a phase reference signal synchronized with the first and second pilot tones;
    the pilot component results from the first and second pilot tones; and
    the coherent feedback circuit is further for coherently generating the error signal based on the phase reference signal and on the pilot component.

16. The electro-optic modulator system of claim 15 wherein:
    the pilot component comprises a second order component.

17. The electro-optic modulator system of claim 15 wherein the coherent feedback circuit comprises:
    a synchronous sampler coupled to the optical sampler for synchronously sampling the pilot component, and
    a conditioning circuit coupled to the synchronous sampler for generating the error signal responsive to the sampled pilot component.

18. The electro-optic modulator system of claim 14 wherein:
    the coherent feedback circuit coherently generates the error signal further responsive to a preselected slope of the bias point; and
    the bias signal is further for maintaining the bias point of the electro-optic modulator at a bias point with the preselected slope.

19. The electro-optic modulator system of claim 14 wherein:
    the coherent feedback circuit coherently generates the error signal responsive to a polarity of the pilot component.

20. In a system comprising an electro-optic modulator having an electrical input, an optical input and an optical output, for modulating an optical carrier received at the optical input by an electrical signal received at the electrical input to produce a modulated optical signal at the optical output, a method for automatically controlling a bias point of the electro-optic modulator comprising the steps of:
    applying a pilot signal to the electrical input of the electro-optic modulator;

generating a coherency reference signal based on the pilot signal;

sampling the optical output of the electro-optic modulator, wherein the sampled optical output includes a pilot component resulting from the pilot signal;

coherently generating an error signal based on the coherency reference signal and on the pilot component;

generating a bias signal responsive to the error signal; and applying the bias signal to the electrical input of the electro-optic modulator.

21. The method of claim 20 wherein the step of generating the pilot signal comprises generating first and second pilot tones coherent with each other and characterized by first and second frequencies, respectively;

the coherency reference signal comprises a phase reference signal synchronized with the first and second pilot tones;

the pilot component results from the first and second pilot tones; and the step of coherently generating the error signal comprises coherently generating the error signal based on the phase reference signal and on the pilot component.

22. The method of claim 21 wherein the step of coherently generating an error signal comprises:

synchronously sampling the pilot component, and generating the error signal responsive to the sampled pilot component.

23. The method of claim 22 wherein:

the pilot component is periodic; and the step of synchronously sampling the pilot component comprises sampling the pilot component at a predetermined time within the period of the pilot component.

24. The method of claim 21 wherein:

the pilot component comprises a second order component.

25. The method of claim 20 wherein the step of coherently generating an error signal comprises:

coherently generating the error signal further responsive to a preselected slope of the bias point.

26. The method of claim 20 wherein:

the step of generating the pilot signal comprises generating first and second pilot tones characterized by first and second frequencies, respectively;

the step of generating a coherency reference signal comprises multiplying together the first and second pilot tones;

the pilot component results from the first and second pilot tones and is characterized by a pilot component frequency, wherein the coherency reference signal is further characterized by the pilot component frequency; and the step of coherently generating the error signal comprises multiplying together the pilot component and the coherency reference signal.

27. The method of claim 20 wherein the step of coherently generating the error signal comprises:

coherently generating the error signal responsive to a polarity of the pilot component.

28. A bias control system for automatically controlling a bias point of an electro-optic modulator, wherein the electro-optic modulator has an electrical input, an optical input and an optical output, for modulating an optical carrier received at the optical input by an electrical signal received at the electrical input to produce a modulated optical signal at the optical output, the bias control system comprising:

a dual pilot tone generator for generating first and second pilot tones applicable to the electrical input of the electro-optic modulator, the first and second pilot tones characterized by first and second frequencies, respectively;

an optical sampler for sampling the optical output of the electro-optic modulator;

a difference frequency feedback circuit coupled to the optical sampler for generating an error signal based on a difference component in the sampled optical output, the difference component resulting from the first and second pilot tones and characterized by a difference frequency equal to the difference between the first and second frequencies; and a bias generator coupled to the feedback circuit for generating a bias signal responsive to the error signal, the bias signal applicable to the electrical input of the electro-optic modulator for controlling the bias point of the electro-optic modulator.

29. The bias control system of claim 28 wherein:

the difference frequency feedback circuit generates the error signal further responsive to a preselected slope of the bias point; and the bias signal is further for maintaining the bias point of the electro-optic modulator at a bias point with the preselected slope.

30. In a system comprising an electro-optic modulator having an electrical input, an optical input and an optical output, for modulating an optical carrier received at the optical input by an electrical signal received at the electrical input to produce a modulated optical signal at the optical output, a method for automatically controlling a bias point of the electro-optic modulator comprising the steps of:

applying first and second pilot tones to the electrical input of the electro-optic modulator, the first and second pilot tones characterized by first and second frequencies, respectively;

sampling the optical output of the electro-optic modulator, wherein the sampled optical output includes a difference component resulting from the first and second pilot tones and characterized by a difference frequency equal to the difference between the first and second frequencies;

generating an error signal based on the difference pilot component;

generating a bias signal responsive to the error signal; and applying the bias signal to the electrical input of the electro-optic modulator.

31. The method of claim 30 wherein:

the step of generating an error signal is further responsive to a preselected slope of the bias point; and the step of applying the bias signal is further for maintaining the bias point of the electro-optic modulator at a bias point with the preselected slope.

* * * * *